No. 755,147. PATENTED MAR. 22, 1904.
P. W. LITCHFIELD.
VEHICLE TIRE.
APPLICATION FILED JUNE 8, 1903.
NO MODEL.
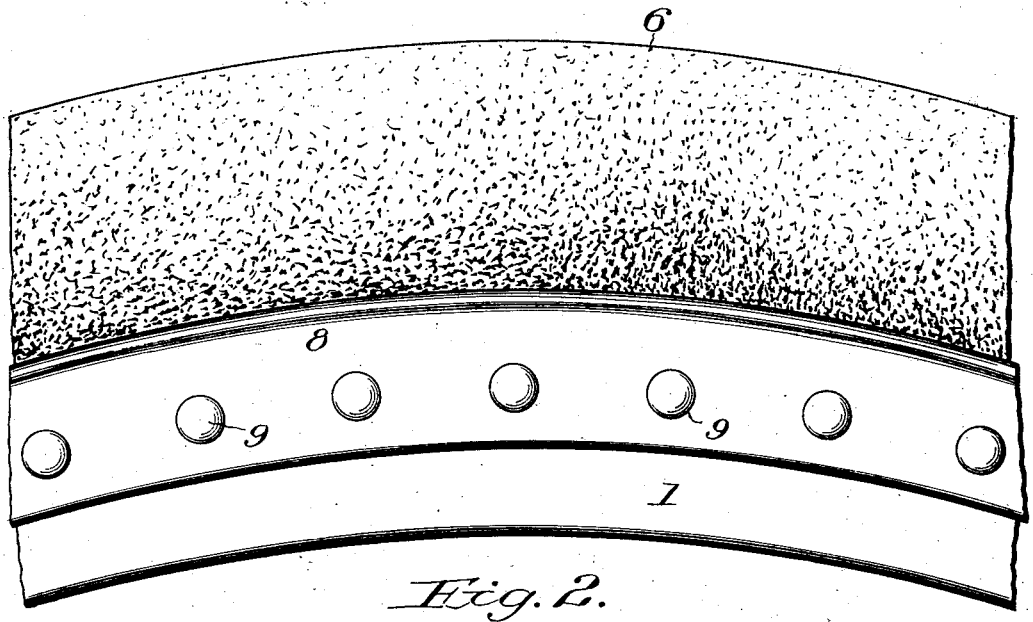
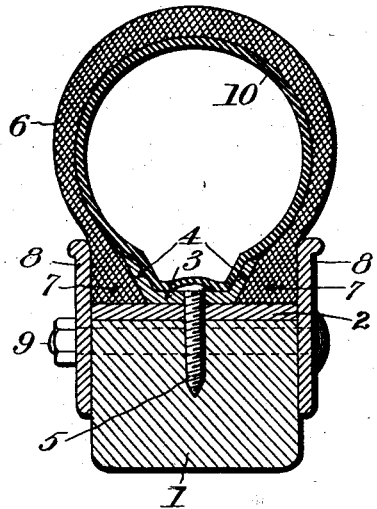

No. 755,147.

Patented March 22, 1904.

UNITED STATES PATENT OFFICE.

PAUL W. LITCHFIELD, OF AKRON, OHIO.

VEHICLE-TIRE.

SPECIFICATION forming part of Letters Patent No. 755,147, dated March 22, 1904.

Application filed June 8, 1903. Serial No. 160,507. (No model.)

*To all whom it may concern:*

Be it known that I, PAUL W. LITCHFIELD, a citizen of the United States, residing at Akron, in the county of Summit and State of Ohio, have invented certain new and useful Improvements in Vehicle Tires and Fellies, of which the following is a specification.

This invention relates to improvements in that type of pneumatic tire and felly in which the outer casing of the tire is detachable from the felly to permit access to and removal of the inner tube; and the object is to provide a tire of this class and felly therefor with improved attaching means whereby the tire may be readily and securely held to the felly of the wheel and positively prevented from "creeping" and to provide means whereby the inner tube will be prevented from forcing beneath the inner edge of the outer casing when inflated.

With the above object in view the invention consists in the novel features of construction hereinafter fully described, particularly pointed out in the claims, and clearly illustrated by the accompanying drawings, in which—

Figure 1 is a side elevation of a portion of a felly with the tire attached thereto embodying my invention, and Fig. 2 a transverse sectional view of the same.

Referring now more particularly to said drawings, 1 designates the felly of the wheel, provided about its periphery with the usual flat metal tire 2. Extending about the periphery of said metal tire 2 and centrally disposed thereon is a locking member in the form of a metal plate or rim 3, having outwardly-flaring side walls 4, said member being firmly secured in position by bolts 5 or other fastening devices which pass through the base thereof and the tire 2 into the felly.

6 designates the outer casing or shoe, which is split or open at its inner periphery and enlarged to form the attaching portions 7, designed to extend on each side of the central rim 3, the inner faces of said attaching portions 7 being beveled to correspond with the contour of the walls of said rim. Said attaching portions 7 are of such width that when in position they extend slightly beyond the sides of the felly, so as to be capable of compression by flanges or plates 8, which are secured to the respective sides of the felly by suitable bolts 9. When said plates 8 are attached to the felly, the attaching portions 7 of the outer casing are compressed and forced into close contact with the flaring or overhanging walls 4 of the rim or locking member 3, and thus said outer casing is rigidly held from disengagement from the felly and positively prevented from creeping thereon. Within the outer casing is an inner inflatable tube 10, which when inflated rests against the locking member 3 and extends within the recess or groove formed by the walls thereof. Any tendency of the inner tube when inflated to blow under the edge of the outer casing is prevented by the rim 3. It is not necessary in attaching or removing the outer casing to stretch the same in any manner, so that there is no tendency to enlarge its diameter, as in the ordinary type of "clencher-tire."

Having thus fully described my invention, what I claim as new, and desire to secure by Letters Patent of the United States, is—

1. The combination with a felly having a rigid band or rim extending around the periphery thereof, centrally disposed and of less width than the width of the felly and provided with outwardly-flaring side walls, of a tire comprising an outer casing split at its inner periphery and formed with attaching portions to fit on each side of the rim and project beyond the sides of the felly, an inner inflatable casing adapted to seat in the space between said flaring wall when inflated, and clamping-plates detachably secured to the respective sides of the felly for compressing said attaching portions of the outer casing and forcing them into contact with the flaring walls of the rim.

2. The combination with a felly having a rim extending around the periphery thereof, centrally disposed and of less width than the width of the felly and having outwardly-flaring side walls and its outer face provided with a continuous recess, of a tire split at its inner periphery and formed with attaching portions adapted to fit on each side of the rim and project beyond the sides of the felly, clamping-plates detachably secured to the respective sides of the felly adapted to compress said attaching portions and force the same into contact with the flaring walls of the rim, and an inflatable inner casing adapted to extend into said recess of the rim.

In testimony whereof I have signed my name to this specification in presence of two witnesses.

PAUL W. LITCHFIELD.

Witnesses:
H. C. PARSONS,
KATIE ORR.